(12) United States Patent
Ikonomov et al.

(10) Patent No.: US 10,081,222 B2
(45) Date of Patent: *Sep. 25, 2018

(54) TIRE SPREADER FOR TIRE REPAIR

(71) Applicants: Michelin Recherche et Technique S.A., Granges-Paccot (CH); Compagnie Generale des Etablissements Michelin, Clermont-Ferrand (FR)

(72) Inventors: Metodi Lubenov Ikonomov, Moore, SC (US); Adib Tony Chebli, Greer, SC (US); Cesar Enrique Zarak, Simpsonville, SC (US); Michael Collins Chandler, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 61 days.

This patent is subject to a terminal disclaimer.

(21) Appl. No.: 14/879,740

(22) Filed: Oct. 9, 2015

(65) Prior Publication Data

US 2016/0031274 A1      Feb. 4, 2016

Related U.S. Application Data

(63) Continuation of application No. 13/982,999, filed as application No. PCT/US2011/023210 on Jan. 31, 2011, now Pat. No. 9,193,228.

(51) Int. Cl.
*B24B 19/00* (2006.01)
*B60C 25/14* (2006.01)

(52) U.S. Cl.
CPC ............ *B60C 25/142* (2013.01); *B60C 25/14* (2013.01); *Y10T 29/49718* (2015.01)

(58) Field of Classification Search
USPC .................................. 451/123, 381; 254/920
See application file for complete search history.

(56) References Cited

U.S. PATENT DOCUMENTS

| 1,345,849 A | 7/1920 | Harkins |
| 1,954,031 A | 4/1934 | Wood |
| (Continued) | | |

FOREIGN PATENT DOCUMENTS

| DE | 9407662 U1 | 7/1994 |
| WO | 2009070146 A1 | 6/2009 |

OTHER PUBLICATIONS

International Search Report and Written Opinion in International Patent Application PCT/US2011/023210 dated Mar. 25, 2011, 40 pages.

(Continued)

*Primary Examiner* — Joseph J Hail
*Assistant Examiner* — Shantese McDonald
(74) *Attorney, Agent, or Firm* — Hahn Loeser & Parks, LLP; Bret A. Hrivnak

(57) ABSTRACT

The present invention concerns methods and apparatus for spreading beads in a tire. Particular embodiments of such methods include securing at least a portion of a first bead of the tire and positioning a tire spreader within the central opening of the tire, the tire spreader having a bead engaging portion for engaging a portion of a second bead generally opposite the secured portion of the first bead. Such methods may further include automatically translating the bead engaging portion of the tire spreader generally in an axial direction of the tire to displace the engaged portion of the second bead a desired distance to increase the distance between the opposing beads to form a widened interior cavity opening.

18 Claims, 2 Drawing Sheets

(56) References Cited

U.S. PATENT DOCUMENTS

| | | | |
|---|---|---|---|
| 2,073,510 A | | 3/1937 | Bishman |
| 2,696,021 A | | 12/1954 | Cox |
| 2,784,937 A | | 3/1957 | Lefke |
| 2,928,119 A | | 3/1960 | Fassero |
| 3,038,203 A | | 6/1962 | Gross |
| 3,044,116 A | | 7/1962 | Spitzmiller |
| 3,157,387 A | * | 11/1964 | Pinter ................ B60C 25/142 |
| | | | 254/50.3 |
| 3,825,965 A | * | 7/1974 | Root .................... B60S 3/042 |
| | | | 118/318 |
| 3,849,941 A | | 11/1974 | Barnes |
| 3,953,942 A | | 5/1976 | Nisimura |
| 4,014,375 A | | 3/1977 | Malinski et al. |
| 4,261,406 A | | 4/1981 | Chemizard et al. |
| 5,044,607 A | | 9/1991 | Haugen et al. |
| 6,729,179 B2 | | 5/2004 | Crema et al. |
| 7,264,032 B2 | | 9/2007 | Peinelt et al. |
| 2010/0243127 A1 | * | 9/2010 | Chebli ................ B29C 73/26 |
| | | | 156/64 |

OTHER PUBLICATIONS

PCT/US2011/054370 International Search Report and Written Opinion, dated Feb. 27, 2012, 12 pages.

\* cited by examiner

TIRE SPREADER FOR TIRE REPAIR

CROSS-REFERENCE TO RELATED APPLICATIONS

This application is a continuation of pending U.S. patent application Ser. No. 13/982,999, filed Jul. 31, 2013, which is a National Stage application of International Application No. PCT/US2011/023210, filed Jan. 31, 2011, to each of which this application claims priority to, and the benefit of, and which incorporates by reference the disclosure of each application identified above.

BACKGROUND OF THE INVENTION

Field of the Invention

This invention relates generally to methods and apparatus for spreading a tire in preparation for repair of an inside tire surface.

Description of the Related Art

To apply a patch along an inside surface of a tire, various treatments are generally required. While typically a certain amount of tire material or other features must be removed from the inside of the tire, several different preparations are employed depending upon the patch and application. For example, applying a patch requires removal of a non-stick coating from the interior surface of the tire, removal of dirt or debris, removal of a bladder imprint, removal of a sufficient depth of material desired for installing the patch, applying a texture to the surface for receipt of the patch, removal of an old patch or other features, and/or other treatments. As used herein, "patch" shall be understood to include a material being added to the interior surface of the tire for purposes of repair as well as a device carrying various components such as e.g., electronic sensors, RFIDs, etc.

In preparing for patch application, various material removal tools and manual techniques may be used for treating the inside surface of the tire. For example, removal of tire material may be performed manually using a material removal tool, such as a grinding or abrading tool, e.g., an abrasive wheel or similar tool. Such material removal operations can be particularly challenging when preparing an interior tire surface, which requires operating the grinding tool inside the tire. This can cause a problem when a smaller tire does not provide sufficient clearance to allow the tire to receive the material removal tool.

Therefore, advantageous solutions that allow for automation and other improvements in treatment preparations for patch application along the inside of various tires are needed. Advantageous solutions that can be used with a variety of tools and treatment techniques as mentioned above would be particularly beneficial.

SUMMARY OF THE INVENTION

Particular embodiments of the present invention include a method for preparing an inside tire surface for repair. Particular embodiments of such method include the step of providing a tire having: a central opening extending axially through the tire along a rotational axis of the tire being bounded radially by an inner bead diameter; an interior tire cavity extending radially outward from the inner bead diameter and being bound by an interior surface of the tire; and an interior tire cavity opening extending between opposing an annular beads of the tire, the cavity being positioned between the central cavity and the interior tire cavity. A further step of such methods may include securing at least a portion of the first bead of the tire. Such methods may include a step of positioning a tire spreader within the central opening of the tire, the tire spreader having a bead engaging portion for engaging a portion of the second bead, the tire engaging portion having a surface for engaging the portion of the second bead, the surface extending in a direction biased relative to a translation direction of the tire spreader. Embodiments of such methods may further include the step of automatically translating the bead engaging portion of the tire spreader generally in an axial direction of the tire to displace the engaged portion of the second bead a desired distance to increase the distance between the opposing beads to form a widened interior cavity opening.

Additional embodiments of the present invention include a machine for spreading the interior of a tire. Particular embodiments of such machine may include a tire spreader translatably mounted to the machine, the tire spreader being in communication with a translation means for forcefully translating a tire engaging portion of the tool a predetermined distance in a translation direction, the tire engaging portion having a surface for engaging a bead of a corresponding tire, the surface extending in a direction biased relative to the translation direction of the tire spreader.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
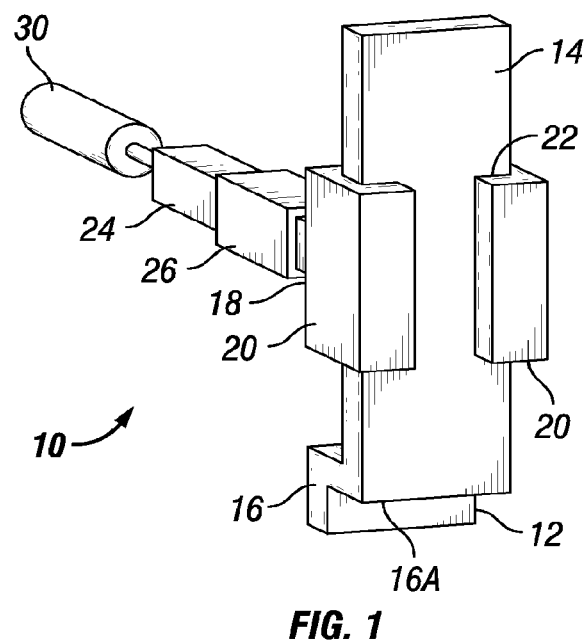
FIG. 1 is a front perspective view of a tire bead spreader, according to an embodiment of the invention.

Particular embodiments of the present invention provide a tire spreader, which increases the distance between opposing beads of a tire to thereby allow access for a material removal tool, such as an abrading tool, to pass between the opposing beads and into an interior tire cavity for preparation of an interior tire surface. Other embodiments include a machine having a tire spreader, and in particular embodiments, a machine also having a material removal tool.

Such methods for preparing an interior tire surface for repair may include the step of providing a tire having: a central opening extending axially through the tire along a rotational axis of the tire being bounded radially by an inner bead diameter; an interior tire cavity extending radially outward from the inner bead diameter and being bound by an interior surface of the tire; and an interior tire cavity opening extending between opposing an annular beads of the tire, the cavity being positioned between the central cavity and the interior tire cavity. Generally, tires have a torus shape, whereby an outer diameter of the torus is generally flat to form an annular tire tread. Along an inner diameter of the torus is an annular opening extending between axially offset bead portions. The annular opening provides access to an annular interior tire cavity, which forms a pressurization chamber when the tire is mounted on a rim. The tire surface lining the interior chamber is referred to herein as the interior tire surface. The tire also includes a central opening extending through the tire, the opening extending axially between the opposing beads and radially inward from the beads between the beads and a rotational axis of the tire. In order to prepare the interior tire surface for repair, a material removal tool is first inserted into the central opening of the tire to ultimately access the interior cavity of the tire. Once in the interior cavity, the tool may be used to remove any foreign material from the interior tire surface and/or any tire material to prepare the tire for receiving a tire patch or any other repair material.

Methods for preparing an interior tire surface for repair may also include the step of securing at least a portion of the first bead of the tire. In order to prepare the interior tire surface, the tire is retained in a desired position, which may better allow for more accurate removal of tire material using the material removal tool. Retaining the first bead in a desired position may prevent lateral translation of the first bead and/or rotation of the first bead about the rotational axis of the tire, for example. Because the opening into the interior tire cavity occurs at the bead area, the first of two beads is secured in particular embodiments. Any means known to one of ordinary skill may be employed, including using a hook or clamp, for example, to secure the first bead.

Such methods may also include the step of positioning a tire spreader within the central opening of the tire, the tire spreader having a bead engaging portion for engaging a portion of the second bead. In particular embodiments, the bead engaging portion engages a portion of the second bead generally opposite the secured portion of the first bead. In order to forcefully displace the second bead away from the first bead to create an enlarged opening through which a material removal tool may pass, structure is provided to engage the second bead. To properly force the bead in an outward direction of the tire, the structure is arranged to engage the interior side of the bead. In particular embodiments, the tire engaging portion includes a surface for engaging the portion of the second bead, the surface extending in a direction biased relative to a translation direction of the tire spreader.

The step of positioning may include, in particular embodiments, manually positioning the bead engaging portion of the bead spreader against the portion of the second bead before performing the step of automatically translating the bead engaging portion, the tire spreader being independently moveable from a tire spreader actuator used to translate the bead engaging portion of the tire spreader. When the tire spreader is independently moveable from a tire spreader actuator, the actuator is not attached to the tire spreader. Because different tire types and sizes may be used in association with the present invention, the present invention includes a means for altering the position in which the tire engaging portion of the tire spreader engages a tire bead. In an effort to accommodate potential bead locations, the step of positioning the spreader includes translating the bead engaging portion generally in a radial direction of a tire to engage the second bead. This may be accomplished by substantially translating tire spreader (as is achieved with the material removal tool assembly as discussed below) or by translating the tire engaging portion relative to other portions of the tire spreader. (For example, see the discussion below concerning the slideable connection between a mount and a base of the tire spreader). In other embodiments, wherein the tire is arranged vertically, whereby the rotational axis of the tire is generally parallel with a ground plane.

Methods for preparing an interior tire surface for repair may include the step of automatically translating the bead engaging portion of the tire spreader generally in an axial direction of the tire to displace the engaged portion of the second bead a desired distance to increase the distance between the opposing beads to form a widened interior cavity opening. In particular embodiments, the bead engaging portion is translated or displaced outwardly by a means for forcefully translating the tire engaging portion of the tire spreader, which may be achieved by pushing or pulling the tire engaging portion. Any means for forcefully translating the tire engaging portion of the tire spreader known to one of ordinary skill may be employed, such as, for example, an actuator. It is understood that "translation" or "translating" as used throughout this application refers to linear and/or curvilinear translation. Accordingly, in particular embodiments, the step of automatically translating the bead engaging portion is accomplished by linearly translating the bead engaging portion of the tire spreader. It is understood that in other embodiments the bead engaging portion may translate in any desired direction or path, including a non-linear or curvilinear path.

In particular embodiments, the means for forcefully translating the tire engaging portion of the tire spreader (also referred to as "the forceful translation means") generally provides an output translation displacement, which may be linear or curvilinear. The forceful translation means may translate the tire engaging portion a distance equal to the output displacement of the forceful translation means, or a distance less than or greater than output displacement. For example, when the forceful translation means is an actuator, the stroke of the actuator is the output displacement. It follows that the step of automatically translating the bead engaging portion may be accomplished automatically by configuring the means for forceful translation to provide (i.e., generate) a constant output translation displacement, for example. In other examples, automatically translating the bead engaging portion may be accomplished automatically in whole or in part by employing any known controller, such as a programmable logic controller. In particular embodiments, such controller includes any known logic processor, such as a microprocessor for example, and may utilize instructions and/or information stored on any known memory storage device, such as any hard disk drive, optical storage device, flash memory, or the like, to control the operation of any material removal tool. Controller may also utilize instructions and/or information received from any input device, such as a user interface for example, to control the operation of any material removal tool.

Particular embodiments of such methods may further include the step of the positioning the tire in a location adjacent a material removal tool. Because the interior tire cavity opening may receive a material removal tool, such as for preparing the interior tire surface for repair, the cavity opening must be of sufficient size to accept the tool. Since the tool size and the undeformed interior tire cavity opening are generally known, it is then known how the opening must be widened to receive the tool. Accordingly, additional embodiments of the step of automatically translating the bead engaging portion includes extending an actuator a sufficient distance to generate the widened interior cavity opening having a minimum width for receiving a material removal tool. When utilizing a tire spreader on various tire types and/or sizes, the narrowest possible interior tire cavity opening width may be known in addition to the minimum width required to receive a desired material removal tool, the actuator may have a constant length stroke to generate the widened interior cavity opening. And when the interior cavity opening of a target tire is sufficiently sized to receive a material removal tool without separating the opposing beads from an undeformed state, either the tire engaging portion may not engage the second bead or the actuator may not engage the tire spreader when the tire spreader is not attached to the actuator and is arranged to engage the second bead prior to actuation of the actuator (such as when manually positioning the tire engaging portion in the step of positioning a tire spreader within the central opening of the tire as noted above). Accordingly, in embodiment where the actuator is not attached to the tire spreader, the actuator engages the tire spreader as the actuator is extending.

Such methods may further include translating a material removal tool into the central opening of the tire, and positioning the material removal tool within the interior tire cavity by translating the tool through the widened interior cavity opening. The material removal tool may comprise any material removal tool known to one of ordinary skill in the art, such as, for example, a pneumatic grinding or abrading tool having a rotary grinding wheel (referred to more generally as a grinder), the grinding wheel having a texturized or bladed grinding surface. Other examples of material removal tools include the use of laser beams, sand blasters, and water jets.

In particular, the material removal tool is an automated material removal tool. Accordingly, the steps of extending and positioning the material removal tool may be automatically performed in whole or in part using a any known controller, such as a programmable logic controller, for example. Controller generally includes any known logic processor, such as a microprocessor for example, and may utilize instructions and/or information stored on any known memory storage device, such as any hard disk drive, optical storage device, flash memory, or the like, to control the operation of any material removal tool. Controller may also utilize instructions and/or information received from any input device, such as a user interface for example, to control the operation of any material removal tool.

Exemplary embodiments of a tire or bead spreader for use in performing such methods are discussed in further detail below.

Figure 2:
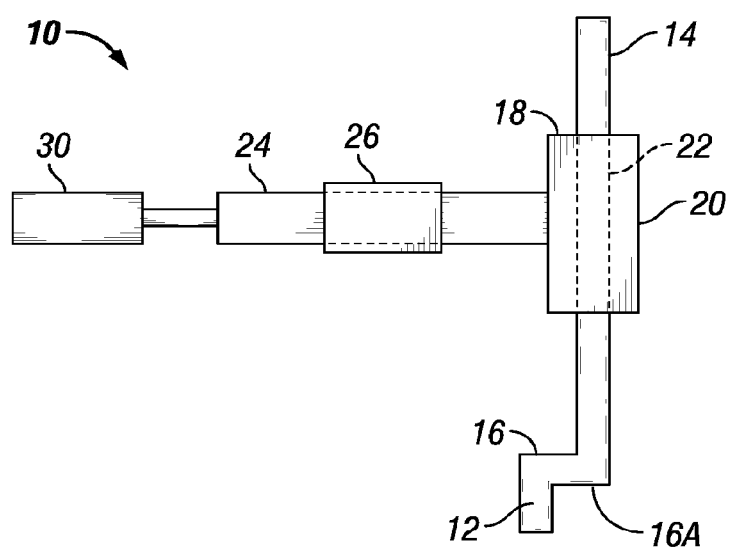
FIG. 2 is a side view of the bead spreader of FIG. 1, in accordance with an embodiment of the invention.
Figure 3:
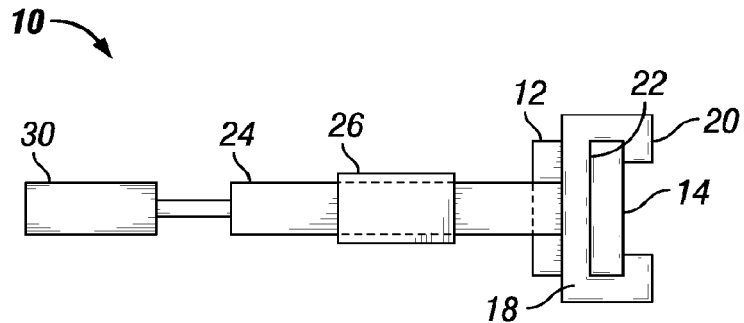
FIG. 3 is an top view of the bead spreader of FIG. 1, according to an embodiment of the invention and, FIG. 4 is a side view of a tire grinding machine including the bead spreader of FIG. 1, according to an embodiment of the invention.

An exemplary embodiment of a tire spreader is shown in FIGS. 1-3. The tire spreader includes a tire (or bead) engaging portion 12 for engaging a bead area of a tire. The tire engaging portion 12 extends from a base member 14 that is slideably connected to a mounting member 18. A translation member 24 slideably maintained within a translation guide 26 attaches to a backside of mounting member 18 and facilitates guided translation of the tire engaging portion 12. An actuator 30 forms a means for translating the tire engaging portion 12 (also referred to as the first translation means when discussing the machine below). In the embodiment shown, tire engaging portion 12 is configured to engage an interior side of a bead area of a tire for the purpose of further separating the engaged bead from an opposing, constrained bead of a tire. It is understood in other variations, however, tire engaging portion 12 is configured to engage the exterior side of a bead area.

Because tire spreader 10 may be used with different tire designs, tire engaging portion 12 is translatable to adapt to the bead location of differently designed tires. For example, tires may have different outer diameters associated with the tire tread and/or may have different bead diameters (see $d_B$ in FIG. 4) for mounting on differently sized wheels, each of which may affect the bead location of a tire relative to tire spreader 10. In the embodiment shown, base 14 is able to slide along mount 18 by virtue of translation guide members 20 extending outwardly from mounting member 18 to surround at least a portion of base member 14 and form a passage 22 for translating base member 14. In other variations, passage 22 may be formed by any structure capable of retaining base 14 in slideable constraint within passage 14. Further, translation guide members 20 may fully extend to form a single translation guide 20 enclosing base 14 within passage 22.

In the embodiment shown, a step 16 is provided between tire engaging portion 12 and base 14. To resist gravitational forces acting on a free sliding base 14 arranged to slide in a vertical manner, step 16 provides a stop surface 16A that rests atop a tire to maintain base 14 in desired position relative to mount 18 and to position tire engaging portion 12 in a desired arrangement. In other variations, any other means for fixing the position of tire engaging portion 12 and sliding base 14 known to one of ordinary skill may be employed. For example, a locking pin may be inserted into an aperture extending through neighboring portions of base 14 and mount 18.

With continued reference to FIGS. 1-3, a means for translating tire engaging portion 12 and forceably applying tire engaging portion 12 against a tire includes a translation member 24 configured to translate within a translation guide 26. In the embodiment shown, translation member 24 forms an elongate member adapted to slide within an elongate box structure 26. It is understood that any known means for improving translation may be employed, such as bearings and/or lubricants, for example. Further, actuator 30 extends outwardly to engage translation member 24, which thereby translates mount 18, base 14, and tire engaging portion 12. Actuator 30, or any other means for forceably translating tire engaging portion 12, may be either operably attached or unattached to any component of tire spreader 10, such as translation member 24. In lieu of actuator 30, means for forceably translating the tire engaging portion may comprise any known means for forceably translating tire engaging portion 12 to engage a tire and to apply a force capable of displacing the tire, regardless of whether such means pushes (i.e., extends) or pulls (i.e., retracts) translation member 24 and thereby mount 18, base 14, and tire engaging portion 12. It is also understood that in other embodiments, the means for forceably translating the tire engaging portion may not engage any translation member 24, and instead generally engage mount 18 or another member associated with mount 18. Finally, the translation path of the various tire spreader components in the embodiment shown is generally linear, yet it is understood that non-linear translation of tire spreader components, including the tire engaging portion, may be employed as desired.

Figure 4:
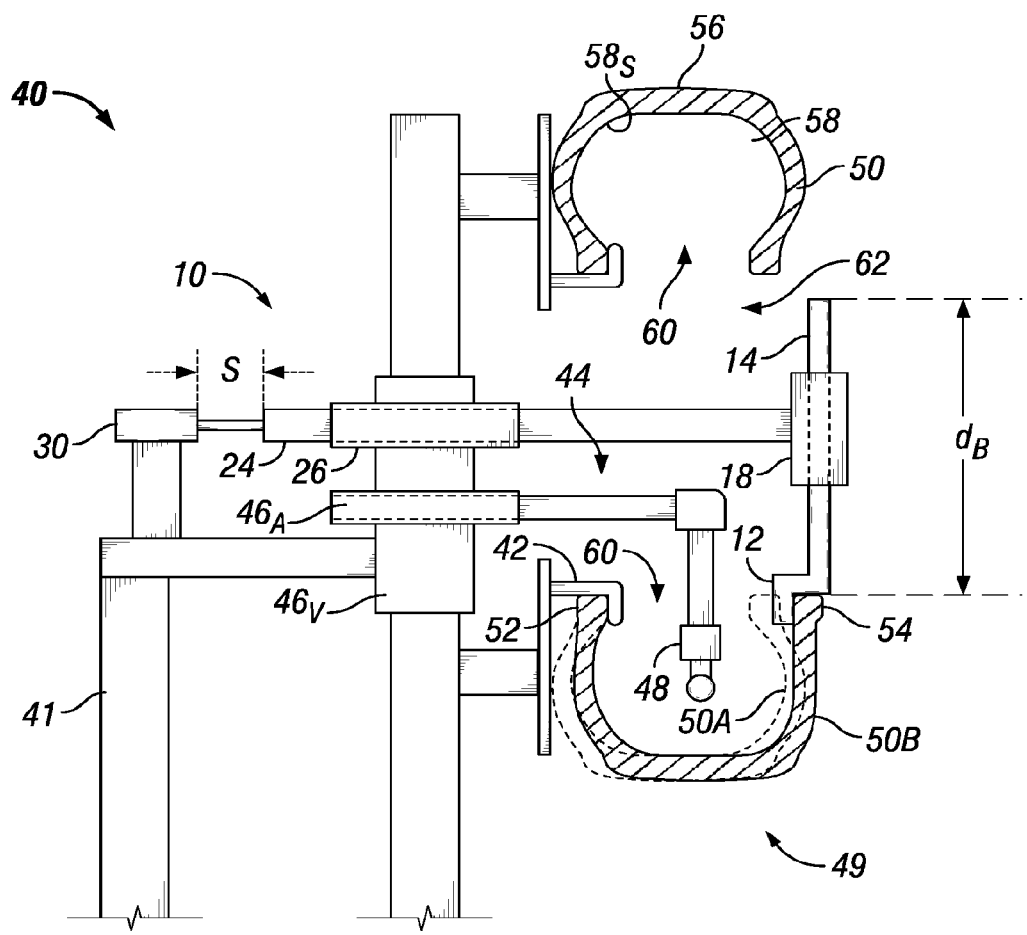

With reference to FIG. 4, an exemplary embodiment of tire repair machine 40 is shown incorporating the tire spreader 10 described above. The machine 40 includes a tire receiving area 49 in which a tire 50 is secured along at least a portion of first bead 52. A securing means 42 is provided, which may comprise any known means for securing bead 52. Tire 50 includes an interior cavity 58 being bounded in part by interior tire surface $58_S$ and an internal cavity opening 60 extending circumferentially between opposing beads. The tire also includes a central opening 62 extending axially through the tire, that is, extending axially inward between beads 52, 54 and radially inward from beads 52, 54 to the rotational axis of the tire. Tire 50 has an outer diameter corresponding with the outer tread surface 56 and an inner bead diameter $d_B$.

The machine further includes a material removal tool assembly 44 having a material removal tool 48 both moveable vertically by way of a means for translating vertically 46$_V$ and moveable in an axial direction of the tire by way of a means for translating axially 46$_A$. Each means for translating 46$_A$, 46$_V$ may comprise any known means for translating. Material removal tool assembly 44 and tire spreader 10 are generally operably attached to machine 10, which may include attachment to any frame structure 41 of the machine 40, for example. In the embodiment shown, both the material removal tool assembly 44 and the tire spreader 10 enter tire 50 from the same side of central opening 62 (i.e., from the same axial side of the tire), whereby the tire spreader 10 is configured to push outwardly in an axial direction outer bead 54 to spread apart opposing beads 52, 54 to create a wider interior tire cavity opening 60. The pre-spread tire configuration is represented by 50$_A$ and the spread tire configuration represented by 50$_B$.

In other embodiments, it is understood that a machine 40 incorporating both a material removal tool 48 and a tire spreader 10 may enter tire 50 on opposing sides of the central cavity 62, that is, from opposing axial sides of the tire. Further, it is understood that machine 40 may comprise separate, independent portions, whereby a material removal tool assembly 44 or material removal tool 48 may be operably attached to one independent, separate portion of the machine and the tire spreader 10 may be operably attached to another independent, separate portion of the machine. For example, when machine 40 comprises two separate portions, the portion including a material removal tool 48 or assembly 44 may be positioned on one axial side of the tire while the other machine portion including the tire spreader 10 is positioned on the opposing axial side of the tire.

With continued reference to FIG. 4, actuator 30, representing any possible means for forceably translating tire engaging portion 12 against a tire, has a stroke S. Stroke S, representing the translation distance of any means for forceably translating the tire engaging portion, may be predetermined regardless of the target tire to be spread, whereby the predetermined translation distance provides an opening 60 having a desired minimum width for receiving a material removal tool or the like. In other variations, the translation distance of any means for forceably translating the tire engaging portion (represented by stroke S) may be variable, where such translation distance may be manually controlled by an operator or may be logically controlled by a controller and/or processor associated with machine 40. The variable distance may be predetermined based upon the target tire type to be spread, where the predetermined distance may be stored on a computer readable medium in association with a tire type and/or size. The target tire type and/or size may be identified by an operator that may enter the information into a user interface, or may be determined by any known means for sensing the tire type or size using the physical dimensions of the tire or by reading any information physically or electronically stored on the tire, such as a barcode or a RFID tag, for example.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method for preparing an interior surface of a tire for repair, the method comprising the steps of:

providing a tire having: a central opening extending axially through the tire along a rotational axis of the tire being bounded radially by an inner bead diameter; an interior tire cavity extending radially outward from the inner bead diameter and being bound by an interior surface of the tire; and an interior tire cavity opening extending between opposing an annular beads of the tire, the cavity being positioned between the central cavity and the interior tire cavity;

securing at least a portion of the first bead of the tire;

positioning a tire spreader within the central opening of the tire, the tire spreader having a bead engaging portion for engaging a portion of the second bead, the bead engaging portion having a surface for engaging the portion of the second bead, the surface extending in a direction biased relative to a translation direction of the tire spreader, wherein the tire spreader further includes a base generally extending perpendicular to the translation direction of the tire spreader, the bead engaging portion extending outwardly from a portion of the base, where the base is slideably retained within a mount member of the tire spreader to slide generally in a radial direction of the tire; and, automatically translating the bead engaging portion of the tire spreader generally in an axial direction of the tire to displace the engaged portion of the second bead a desired distance to increase the distance between the opposing beads to form a widened interior cavity opening, where the step of positioning a tire spreader within the central opening of the tire includes manually positioning the bead engaging portion of the bead spreader against the portion of the second bead before performing the step of automatically translating the bead engaging portion, the tire spreader being independently moveable from a tire spreader actuator used to translate the bead engaging portion of the tire spreader.

2. The method of claim 1, wherein the step of automatically translating the bead engaging portion is accomplished by linearly translating the bead engaging portion of the tire spreader.

3. The method of claim 1, wherein the step of automatically translating the bead engaging portion includes extending an actuator having a stroke sufficient to generate the widened interior cavity opening to receive a material removal tool.

4. The method of claim 1, wherein the actuator engages the tire spreader as the actuator is extending.

5. The method of claim 1, wherein the actuator has a constant length stroke to generate the widened interior cavity opening.

6. The method of claim 1, wherein the step of positioning the spreader includes translating the bead engaging portion generally in a radial direction of the tire to radially position the bead engaging portion prior to the step of automatically translating the bead engaging portion.

7. The method of claim 6, wherein the tire is arranged vertically, whereby the rotational axis of the tire is generally parallel with a ground plane.

8. The method of claim 1, where the bead engaging portion is offset from the base to create a stop surface for radially engaging an associated tire bead.

9. The method of claim 1, where the translation means is arranged to independently engage and disengage a translation member of the tire spreader, the translation member extending longitudinally in a translation direction of the tire spreader, the bead engaging portion of the tire spreader extending generally in a radial direction of the tire, the translation member of the tire spreader being slideably retained by a translation guide, where the mount member is operably attached to the translation member.

10. The method of claim 1, wherein the step of automatically translating the bead engaging portion provides a widened interior cavity opening having a minimum width sufficient for receiving a material removal tool, and where the method further comprises the steps of:
- positioning the tire in a location adjacent the material removal tool;
- translating the material removal tool into the central opening of the tire; and,
- positioning the material removal tool within the interior tire cavity by translating the material removal tool through the widened interior cavity opening.

11. A machine for spreading the interior of a tire, the machine comprising:
- a tire spreader translatably mounted to the machine, the tire spreader being in communication with a translation means for forcefully translating a tire engaging portion of the tool a predetermined distance in a translation direction, the tire engaging portion having a surface for engaging a bead of a corresponding tire, the surface extending in a direction biased relative to the translation direction of the tire spreader; and,
- a controller for automatically translating the tire engaging portion of the tire spreader generally in an axial direction of the tire,
- where the tire engaging portion of the bead spreader is manually positionable against a portion of a second bead of the tire before automatically translating the tire engaging portion of the tool with the translation means, the tire spreader being independently moveable from the translation means used to translate the tire engaging portion of the tire spreader, and
- where the translation means is a linear actuator arranged to independently engage and disengage a translation member of the tire spreader, the translation member extending longitudinally in a translation direction of the tire spreader, the tire engaging portion of the tire spreader extending generally in a radial direction of the tire, the translation member of the tire spreader being slideably retained by a translation guide.

12. The machine of claim 11 further comprising:
- a tire receiving area having a means for securing at least a portion of a first tire bead, the tire spreader being arranged to engage a second tire bead positioned opposite the first tire bead in an axial direction of a tire.

13. The machine of claim 11, wherein the tire spreader further includes a base generally extending perpendicular to the translation direction of the tire spreader, the tire engaging portion extending outwardly from a portion of the base.

14. The machine of claim 13, wherein the tire engaging portion is offset from the base to create a stop surface for radially engaging an associated tire bead.

15. The machine of claim 13, wherein the base is slideably retained within a mount member of the tire spreader to slide generally in a radial direction of the tire.

16. The machine of claim 15, wherein the base slideably extends through an aperture within the mount member.

17. The machine of claim 15, wherein the mount member is operably attached to the translation member.

18. The machine of claim 11 further comprising:
- an abrading tool translatably mounted to the machine, the tool being in operable communication with a first translation means for translating the abrading tool into the central opening of a tire.

* * * * *